United States Patent [19]

Shigenai et al.

[11] Patent Number: 4,672,490
[45] Date of Patent: Jun. 9, 1987

[54] RECORDING AND REPRODUCING DEVICE FOR MAGNETIC DISC INCLUDING A HEAD DAMPING DEVICE

[75] Inventors: Osamu Shigenai; Yukio Saito, both of Furukawa; Kunihiko Gunji, Miyagi; Motohiro Shimaoka, Furukawa; Yasuyuki Hirose, Furukawa; Masao Okita, Furukawa, all of Japan

[73] Assignee: Alps Electric Co. Ltd., Japan

[21] Appl. No.: 650,817

[22] Filed: Sep. 13, 1984

[30] Foreign Application Priority Data

Sep. 13, 1983 [JP] Japan .......................... 58-140903[U]

[51] Int. Cl.⁴ ...................... G11B 5/54; G11B 21/22; G11B 5/56; G11B 21/24
[52] U.S. Cl. ..................................... 360/105; 360/109
[58] Field of Search .................. 360/97, 99, 104, 105, 360/109

[56] References Cited

U.S. PATENT DOCUMENTS

| | | | |
|---|---|---|---|
| 4,306,260 | 12/1981 | Maeda et al. | 360/105 |
| 4,308,564 | 12/1981 | Thompson | 360/99 |
| 4,347,535 | 8/1982 | Dalziel | 360/99 |
| 4,355,339 | 10/1982 | King et al. | 360/99 |
| 4,376,294 | 3/1983 | Meier et al. | 360/105 |
| 4,437,132 | 3/1984 | Shimoaka | 360/99 |
| 4,485,464 | 11/1984 | Shimoaka | 360/97 |

Primary Examiner—Robert S. Tupper
Assistant Examiner—Koval Melissa J.
Attorney, Agent, or Firm—Guy W. Shoup

[57] ABSTRACT

In a recording and reproducing device for a magnetic disc, a swingable holder fixedly supports a first magnetic head, while a carriage supporting the holder swingably further supports a second magnetic head in a fixed manner. During a head-load time, the first and second magnetic heads are held in contact with the upper and lower surfaces of the magnetic disc at positions opposite to each other thereby to record or reproduce information to or from the magnetic disc. The recording and reproducing device of the above described construction is further improved by providing a damper device in a moving range of the holder so that the damper device can reduce impact when the first and second magnetic heads are brought into contact with the magnetic disc.

1 Claim, 7 Drawing Figures

RECORDING AND REPRODUCING DEVICE FOR MAGNETIC DISC INCLUDING A HEAD DAMPING DEVICE

BACKGROUND OF THE INVENTION

1. Field of the Invention

This invention relates to a recording and reproducing device to be used for a magnetic disc, and more particularly to a type thereof wherein magnetic heads are provided to abut on both sides of the magnetic disc.

2. Description of Prior Art

Heretofore, a recording and reproducing device of the above described type has been so constructed that a holder provided with a magnetic head is rotated, at a head-load time, toward a carriage supporting another magnetic head, so that the holder descends approximately 7 mm until the magnetic head supported thereon abuts against the magnetic disc, and an impact force of approximately 100 g is applied to the magnetic head, thereby tending to damage the magnetic head.

SUMMARY OF THE INVENTION

An object of the present invention is to provide a recording and reproducing device for a magnetic disc wherein the above described difficulties of the conventional device can be substantially eliminated.

Another object of the invention is to provide a recording and reproducing device for a magnetic disc, wherein the impact force applied, at the head-load time, to the magnetic head can be substantially reduced.

These and other object of the present invention can be achieved by a recording and reproducing device for a magnetic disc, comprising a swingable holder fixedly supporting a first magnetic head, and a carriage fixedly supporting a second magnetic head and also supporting the holder swingably, the first and second magnetic heads being held, during a head-load time, in contact with two side surfaces of the magnetic disc at positions opposite to each other, thereby to record and reproduce information in and out of the magnetic disc, characterized in that a damper device is further provided in a moving range of the holder for reducing impact caused when the first and second magnetic heads are brought into contact with the magnetic disc.

Preferably the damper device comprises a damper lever and a pivot pin rotatably securing the damper lever to chassis, with silicone grease of a high viscosity applied between the damper lever and the pivot pin.

Preferably a coil spring is provided between the damper lever and the chassis for separating the damper lever out of the holder after effecting the damping action against the swinging movement of the holder.

DESCRIPTION OF THE PREFERRED EMBODIMENTS

Figure 1:
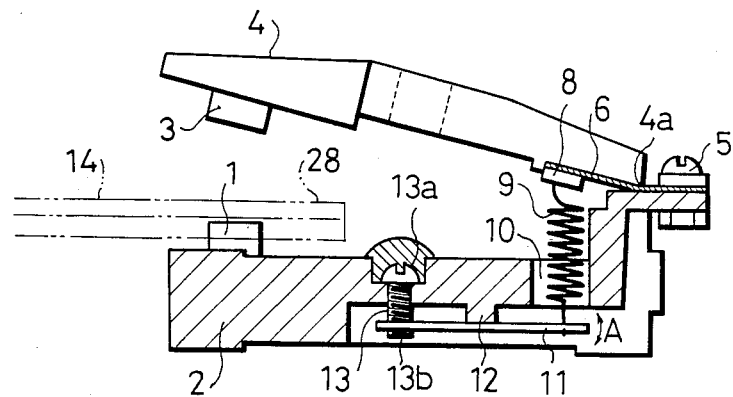
FIG. 1 is an elevational view, partly in section, showing a preferred embodiment of this invention.

The preferred embodiments of the present invention will now be described with reference to FIGS. 1 through 7.

A recording and reproducing device constituting a preferred embodiment of this invention oomprises a carriage 2 on which a second magnetic head 1 is fixedly mounted. Upwardly of the carriage 2 is provided a holder 4 on which a first magnetic head 3 is fixedly mounted at a position substantially opposing to the second magnetic head 1. An end of a leaf spring 6 is secured to the carriage 2 at a right end as viewed in FIGS. 1 and 2 by means of screws 5. The other end of the leaf spring 6 is secured by means of screws 7 to the corresponding end of the holder 4, so that the holder 4 is swingable around a right end portion 4a under the resilience of the leaf spring 6. The holder 4 has a spring mounting portion formed integrally with the holder 4. One end of a tension spring 9 is held by the spring mounting portion 8, while the other end of the tension spring 9 is extended through a hole 10 formed through the carriage 2 and secured to an end of a lever 11 which is extended along the lower side of the carriage 2 to be swingable around a fulcrum portion 12 that projects downwardly from the lower surface of the carriage 2. The other end of the lever 11 is secured to the screw portion 13b of an adjusting screw 13 which is driven vertically through the carriage 2 so that the head portion 13a thereof is disposed on the upper surface of the carriage 2. By adjusting the vertical position of the adjusting screw 13, the lever 11 is swung around the fulcrum portion 12 in the arrow marked directions A. The swinging movement of the lever 11 varies the tension of the tension spring 9 exerted on the holder 4 and adjusts the pressing forces of the magnetic heads 1 and 3 exerted on a magnetic disc 14.

According to the embodiment of the invention, a damper or buffer device 15 is provided in the moving range of the holder 4. More specifically the damper or buffer device 15 comprises a damper lever 17 having an elongated portion 17a and a bearing portion 17b, and a member having an enlarged diameter portion 22 passing through a hole 20 provided in the bearing portion 17b, and a reduced diameter portion 21 provided at an end of the enlarged diameter portion 22. A rectangular shaped supporting head 23 is further provided at the other end of the enlarged diameter portion 22. The reduced diameter portion 21 of the member operable as a pivot shaft passing through the bearing portion 17b of the damper lever 17 is received in a hole 18 formed through a vertically projecting portion 16 of the chassis supporting the carriage 2, and rotatably secured therein, for instance, by a machine screw driven into the portion 21 from the other side of the vertically projecting portion 16 of the chassis. A cylindrical spacer 19 having a central hole is further interposed around the portion 21 between the enlarged diameter portion 22 of the pivotal shaft member and one side surface of the vertically projecting portion 16 of the chassis. A high viscosity material 24 such as silicone grease and the like is beforehand applied around the enlarged diameter portion 22 so that the gap between the internal surface of the hole 20 in the bearing portion 17b and the outer surface of the enlarged diameter portion 22 of the the shaft member is filled by the high viscosity material 24. A coil spring 25 is placed around the cylindrical spacer 19 for urging the damper lever 17 in a counter-clockwise direction. More specifically, an end of the coil spring 25 is held in a groove 26 formed in the bearing portion 17b, while the other end of the coil spring 25 is secured along the outer surface of a step motor 27 provided for driving the carriage 2. The elongated portion 17a of the damper lever 17 is disposed below an engaging arm 4b projecting outwardly from one side of the holder 4.

As is well known in the art, the carriage 2 is driven by a screw threaded shaft rotated by the step motor 27 under guidance of a guide shaft. When a cartridge 28 containing a magnetic disc 14 is inserted, the holder 4 as well as the cartridge 28 are set by suitable means to predetermined positions. When the first and second magnetic heads 1 and 3 are brought into abutment with the magnetic disc 14, writing and reading of information in and out of the magnetic disc 14 can be carried out successively. The damping effect of the buffer or damping device 15 will now be described in detail.

Figure 2:
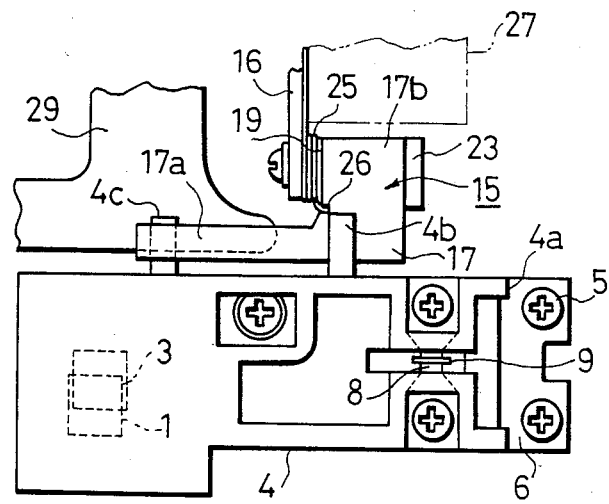
FIG. 2 is a top plan view of the embodiment shown in FIG. 1.
Figure 3:
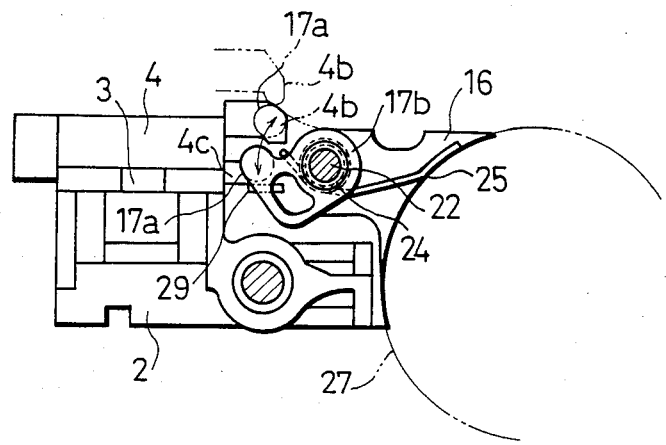
FIG. 3 is an elevational view, partly in section, showing a portion of the embodiment in the neighborhood of a buffer device.
Figure 4:
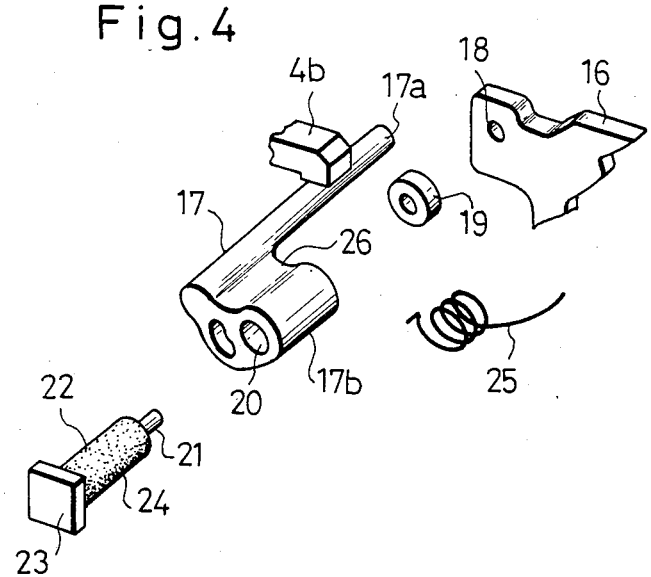
FIG. 4 is a perspective view, in exploded state, showing the buffer device.
Figure 5:
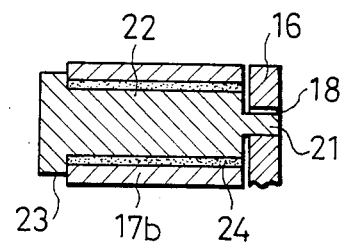
FIG. 5 is a sectional view of the buffer device.

When a cartridge holder 29 is lowered by suitable means as shown in FIG. 2, the engagement between a projection 4c from the holder 4 and the cartridge holder 29 is released, thus releasing the holder 4 from its upper position as shown in FIG. 1. That is, the holder 4 is rotated in a counter-clockwise direction, as viewed in FIG. 1 under the action of the tension spring 9. At this time, the engaging arm 4b of the holder 4 abuts against the elongated portion 17a of the damper lever 17 as shown in FIG. 3, thereby preventing the direct impacts of the first and second magnetic heads 1 and 3 to the magnetic disc 14. By the abutment of the engaging arm 4b to the elongated portion 17a, the elongated portion 17a is rotated slowly under the damping effect of the high viscosity material 24 such as silicone grease and the like placed within the hole 20 in the bearing portion 17b, and hence the holder 4 is rotated slowly in the counter-clockwise direction. As a consequence, the first magnetic head 3 provided on the holder 4 is brought into contact slowly with the magnetic disc 14, so that the magnetic head 3 is prevented from being damaged.

In case where the engaging arm 4b is held in contact with the elongated portion 17a after the completion of the damping action during the head load time, a frictional force is exerted when the carriage is moved for track seeking. In order to eliminate such a disadvantage, the damper lever 17 is rotated by the coil spring 25 in the counter-clockwise direction so that the elongated portion 17a of the damper lever 17 is separated from the engaging arm 4b of the holder 4. The rotation of the damper lever 17 terminates when the elongated portion 17a of the damper lever 17 abuts against the cartridge holder 29 in its lower stop position. When the cartridge holder 29 returns to the upper stop position after removal of the cartridge 28 from the cartridge holder 29, the cartridge holder 29 releases the elongated portion 17a so as to bring back the damper lever 17 to its original position indicated by two dot dash line in FIG. 3, and disengages the projection 4c thereby to bring back the holder 4 to its original position shown in FIG. 1.

Figure 6:
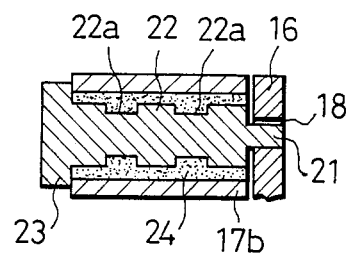
FIGS. 6 and 7 are sectional views showing further embodiments of the buffer device.
Figure 7:
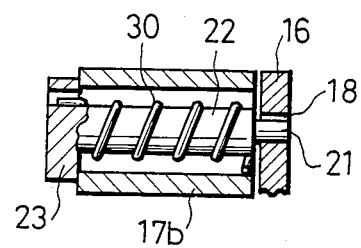

Various modifications may be considered in the construction of the damper device 15. For instance, a plurality of grooves 22a may be formed in the enlarged diameter portion 22 as shown in FIG. 6, thereby to increase the quantity of grease 24 and to improve the damping effect. Otherwise, a coil spring 30 may be provided around the enlarged diameter portion 22 as shown in FIG. 7 so that one end of the coil spring 30 is secured to the rectangular head 23 while the other end of the coil spring 30 is secured to the bearing portion 17b. Where the damper lever 17 is rotated in a direction untightening the coil spring 30, the damping effect of the damper lever 17 can be improved. Alternatively, a construction of the damper device 15 utilizing air resistance may also be considered.

According to the present invention, since a damper device is provided in the moving range of the holder so as to be contactable with the holder, an improved recording and reproducing device for use with a magnetic disc wherein the movements of two magnetic heads are effectively damped can be realized.

What is claimed is:

1. In a recording and reproducing device for a magnetic disc, of the type having a carriage fixedly supporting a first magnetic head, a head holder, having one end pivotably mounted to said carriage and its other end fixedly supporting a second magnetic head and being swingable toward and away from said carriage to lower said second magnetic head to an operative position in contact with a side of a magnetic disc opposite from said first magnetic head when a magnetic disc is positioned therebetween, and to raise said second magnetic head away from said first magnetic head when said magnetic disc is to be removed, biasing means for urging said head holder toward said carriage, and a cartridge holder adapted to receive a cartridge containing a magnetic disc and to move said cartridge to a position for placing said magnetic disc at said operative position, said cartridge holder having a lifting portion for raising said head holder to separate the same from said carriage in opposition to said biasing means when said cartridge is to be released, the improvement comprising a damper device for damping the movement of said head holder toward and away from said carriage, said damper device having a member engaged with said lifting portion of said cartridge holder for damping the raising of said head holder, and said member engaging an engagement portion of said head holder for damping the lowering of said head holder, wherein said engagement portion of said holder presses on a damper lever of said damper device which in turn presses on said cartridge holder.

* * * * *